Patented June 8, 1954

2,680,727

UNITED STATES PATENT OFFICE 2,680,727

POLYVINYL ACETALS STABILIZED WITH 2-THIAZOLINE-2-THIOL

Charles H. Jarboe, Louisville, Ky., assignor to E. I. du Pont de Nemours and Company, Wilmington, Del., a corporation of Delaware No Drawing. Application April 17, 1953, Serial No. 349,547

3 Claims. (Cl. 260—45.8)

This invention relates to new compositions of matter and more particularly to a new composition of matter comprising a polyvinyl acetal, e. g. polyvinyl butyral, and a modifier thereof.

In the manufacture of high quality safety glass interliner, and particularly safety glass interliners which meet the high standards which have been established in connection with the use of safety glass in aircraft, it is essential to impart a considerably higher degree of thermal stability to the interliner than is obtainable in unmodified polyvinyl butyral resins. Various attempts have been made in the past to provide a polyvinyl butyral which exhibits improved thermal stability, and various additives have been suggested which have had the effect of inhibiting to some extent the thermal degradation of polyvinyl butyral resins.

An object of this invention is to provide an improved polyvinyl acetal composition having high thermal stability.

It has been discovered, in accordance with the present invention, that polyvinyl acetals, and particularly butyrals, which are stabilized with 2-thiazoline-2-thiol of the formula

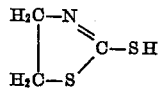

are outstandingly resistant to thermal degradation.

The quantity of 2-thiazoline-2-thiol which is employed in the practice of this invention is generally within the range of about 0.05 to 5% of the weight of polyvinyl butyral, excellent results being obtained when the content of 2-thiazoline-2-thiol is in the range of about 0.1 to 1.0%. For economic reasons, it is generally better to employ the minimum effective quantity.

The following example shows the extraordinary effect of 2-thiazoline-2-thiol in preventing the breakdown of polyvinyl butyral at elevated temperatures. The viscosities given in the example were measured at 25° C. The viscosity is that of a 5% solution of polyvinyl butyral in 2B ethanol.

EXAMPLE

Polyvinyl butyral safety glass interlayer sheeting was prepared in the conventional commercial manner except that 0.2 part of 2-thiazoline-2-thiol were admixed with 100 parts of the resin prior to extrusion. To determine the effect of the modifier on thermal stability, samples of the unmodified polymer, and samples of the polymer containing 0.2 part of 2-thiazoline-2-thiol per 100 parts of polymer were separately heated in an oven for one hour at 125° C., and the viscosities of a 5% solution of the resin compositions in 2B alcohol were measured. The solution of the polymer which contained no modifier had a viscosity of 18 C. P. S. Correspondingly, the solution of the polyvinyl butyral sheeting (heated as above described) which contained 0.2 part 2-thiazoline-2-thiol per 100 parts of the resin was found to have a viscosity of 74 C. P. S. (100% of the initial viscosity). From these results it is apparent that the modifier prevented the thermal degradation of the polymer at 125° C.

Other polyvinyl acetals, such as polyvinyl formals, mononals, etc., are stabilized in a similar manner. The percentage of acetalization, and the content of free hydroxyl, and unsaponified ester groups is not critical.

The results reported in the foregoing example show a degree of inhibition of degradation greater than is obtainable with any of the classes of inhibitors heretofore commonly used. This is further shown by the results reported in the following table.

Comparison of 2-thiazoline-2-thiol with other polyvinyl butyral stabilizers

| Stabilizer | 2,5-ditertiary butyl hydroquinone | N-phenyl beta naphthylamine | p-octyl phenol |
|---|---|---|---|
| Concentration in resin (parts per 100 parts of polyvinyl butyral) | 0.2 | 0.2 | 0.2 |
| Stabilizing effect (percentage of initial viscosity retained after heating one hour at 125° C.) | 42 | 39 | 53 |

One of the advantages of the 2-thiazoline-2-thiol modifier is its effectiveness when employed in very small quantities. Because of this a very great improvement is obtainable in polyvinyl butyral sheeting for aircraft applications at a virtually negligible cost.

The present invention is limited only as set forth in the following claims.

I claim:

1. A composition of matter comprising a polyvinyl acetal and from 0.05 to 5% by weight of 2-thiazoline-2-thiol.

2. A composition of matter comprising polyvinyl butyral and from 0.05 to 5% of 2-thiazoline-2-thiol based on the weight of the polyvinyl butyral.

3. A composition of matter comprising polyvinyl butyral and from 0.1 to 1.0% of 2-thiazoline-2-thiol based on the weight of the polyvinyl butyral.

No references cited.